(12) United States Patent
Watanabe et al.

(10) Patent No.: US 7,051,936 B2
(45) Date of Patent: May 30, 2006

(54) BAR CODE READER AND BAR CODE READ CONTROL METHOD

(75) Inventors: Mitsuo Watanabe, Tokyo (JP); Kozo Yamazaki, Tokyo (JP); Mitsuharu Ishii, Tokyo (JP); Masanori Ohkawa, Tokyo (JP); Isao Iwaguchi, Tokyo (JP); Hideo Miyazawa, Tokyo (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 10/694,274

(22) Filed: Oct. 29, 2003

(65) Prior Publication Data

US 2004/0084533 A1 May 6, 2004

(30) Foreign Application Priority Data

Oct. 31, 2002 (JP) ............................ 2002-318510

(51) Int. Cl.
*G06K 15/00* (2006.01)
*G06K 7/10* (2006.01)

(52) U.S. Cl. .............................. 235/462.13; 235/462.01

(58) Field of Classification Search .......... 235/462.01, 235/462.13, 385; 705/22, 28
See application file for complete search history.

(56) References Cited

U.S. PATENT DOCUMENTS

| 5,367,148 A | 11/1994 | Storch et al. |
| 5,786,584 A | 7/1998 | Button et al. |
| 6,148,091 A * | 11/2000 | DiMaria ..................... 382/115 |
| 6,308,893 B1 * | 10/2001 | Waxelbaum et al. ... 235/472.01 |
| 6,327,576 B1 * | 12/2001 | Ogasawara .................. 705/22 |
| 2002/0130184 A1 | 9/2002 | Sanders et al. |
| 2003/0204359 A1* | 10/2003 | Blakley ...................... 702/130 |

FOREIGN PATENT DOCUMENTS

| EP | 0762311 A2 | 12/1997 |
| JP | 58-169285 A | 10/1983 |
| JP | 4-95198 A | 3/1992 |
| JP | 4-192089 A | 7/1992 |
| JP | 5-054211 A | 3/1993 |
| JP | 5-324881 A | 12/1993 |
| JP | 8-329350 A | 12/1996 |
| JP | 9-305805 A | 11/1997 |
| JP | 10-033799 A | 2/1998 |
| JP | 11-120240 A | 4/1999 |
| JP | 2000-287003 A | 10/2000 |

* cited by examiner

*Primary Examiner*—Karl D. Frech
*Assistant Examiner*—Lisa M. Caputo
(74) *Attorney, Agent, or Firm*—Staas & Halsey LLP

(57) ABSTRACT

A bar code reader has an arrangement to communicate with a host apparatus. The bar code reader includes a read unit that reads a bar code attached to an article, and outputs bar code information corresponding to the read bar code; a term information acquisition unit that acquires term information included in the bar code information; and a term expiration check unit that checks whether the term of the article has expired based on the term information. A notification unit notifies that the term of the article has expired upon determination by the term expiration check unit that the term of the article has expired.

9 Claims, 6 Drawing Sheets

FIG.2

|  |  | 21 | 22 | 23 | 0 | 1 | 2 | 3 | 4 | 5 | 6 |
|---|---|---|---|---|---|---|---|---|---|---|---|
| ERROR TIME INFORMATION | SET AT 0 HOUR | | TERM DOES NOT EXPIRE | | | TERM EXPIRES | | | | | |
| | SET AT 2 HOURS | | TERM DOES NOT EXPIRE | | | | | TERM EXPIRES | | | |
| | SET AT 4 HOURS | | TERM DOES NOT EXPIRE | | | | | | | TERM EXPIRES | |

─────SEPTEMBER 14, 2002─────►◄─────SEPTEMBER 15, 2002─────

US 7,051,936 B2

BAR CODE READER AND BAR CODE READ CONTROL METHOD

BACKGROUND OF THE INVENTION

1) Field of the Invention

The present invention relates to technology for distributing load of a host apparatus in a POS (Point of Sale) system.

2) Description of the Related Art

Japanese Patent Application Laid-Open Nos. 5-054211, 8-329350, and 11-120240 disclose the conventional POS systems.

One approach employed in the POS systems is to optically read a bar code attached to an article and obtain information about the article from a host computer based on the read bar code. The bar code is read with a bar code reader or a bar code scanner. The information, which contains characters, about the article includes name of the article, price of the article, information about expiry dates, if any, of the article.

FIG. 7 is a block diagram of a conventional POS system. Bar code readers $10_1$ to $10_n$ are placed at various locations in the shop or the department store. These bar code readers $10_1$ to $10_n$ have an arrangement to optically read a bar code attached to an article. The read bar code information is transmitted to the host apparatus 20.

A bar code represents information in the form of black and white bars. The bar code readers have a laser diode to emit laser and scan the bar code with the laser, a light receiver to receive the light reflected from the bar code, signal converter to convert the received light to electric signal, and a means to convert the electric signal into the bar code information and send the bar code information to the host apparatus 20.

A storage containing a PLU file 30 is attached to the host apparatus 20. This PLU file 30 contains information about all the articles (hereinafter, "article information") in that particular shop or the department store. The article information includes name of the article, price of the article etc. The article information for an article is stored in correspondence with the bar code information of that article. Thus, when the host apparatus 20 receives a bar code information from any of the bar code reader 101 to $10n$, it retrieves the article information, and sends the article information to the bar code reader from where the bar code information was received.

The storage containing a PLU file 30, for example, stores term information, which represents a period until which the article can be sold or eaten (hereinafter, "the term of the article has expired"), in correspondence with the bar code information of that article. The host apparatus 20 has a timer which keeps an account of time, (for example, date, hour, and minute) when the bar code information is received (hereinafter, "current time"). When the host apparatus 20 receives a bar code information from a bar code reader, it retrieves the term information corresponding to that article and checks whether the current time is within the period represented in the term information. If the current time is later than the period represented in the term information, then the host computer 20 send a signal to the bar code reader from where the bar code information was received to display a warning on the display of that bar code reader.

When an operator of the bar code reader sees such a warning on the display, it means that the term of the article has expired, and he/she performs a processing to cancel the purchase of the article.

The bar code reader $10n$, for example, is a handy reader and can be used for the inventory of articles. In this case, the operator scans the bar code of an article to be displayed on shelves. As a result, the bar code information of that article is transferred from the bar code reader $10n$ to the host apparatus 20. The host apparatus 20 compares the term information with the current time, and checks whether the term of the article has expired. If the term of the article has expired, the host apparatus 20 transmits a signal to the bar code reader $10n$ to display on the display of the bar code reader $10n$ that the term of the article has expired. When such warning is displayed on the display of the bar code reader $10n$, the operator does not place the article on the shelf.

The conventional POS systems have a problem that, since only the host apparatus performs the retrieval of the article information and the term information and checking of whether the term of the article has expired, the host apparatus is always overload with work. In case of large-scale shops, there are over 100 bar code readers, and there is a huge load on the host apparatus 20. A high-end machine may be used as the host apparatus 20 to solve the problem of the overload, but that results in cost increase.

SUMMARY OF THE INVENTION

It is an object of the present invention to solve at least the problems in the conventional technology.

A bar code reader according to one aspect of the present invention has an arrangement to communicate with a host apparatus in a POS system. The bar code reader includes a read unit that reads a bar code attached to an article, and outputs bar code information corresponding to the read bar code; a term information acquisition unit that acquires term information included in the bar code information; a term expiration check unit that checks whether the term of the article has expired based on the term information; and a notification unit that notifies that the term of the article has expired upon determination by the term expiration check unit that the term of the article has expired.

A bar code read control method according to another aspect of the present invention is applied to a bar code reader having an arrangement to communicate with a host apparatus in a POS system. The method includes reading a bar code attached to an article, and outputting bar code information corresponding to the read bar code; acquiring term information included in the bar code information; checking whether a term of the article has expired based on the term information; and notifying that the term of the article has expired upon determination that the term of the article has expired.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 illustrates in detail the contents of an error time information according to the embodiment;

DETAILED DESCRIPTIONS

Exemplary embodiments of a bar code reader according to the present invention will be explained hereinafter in detail with reference to the drawings.

Figure 1:
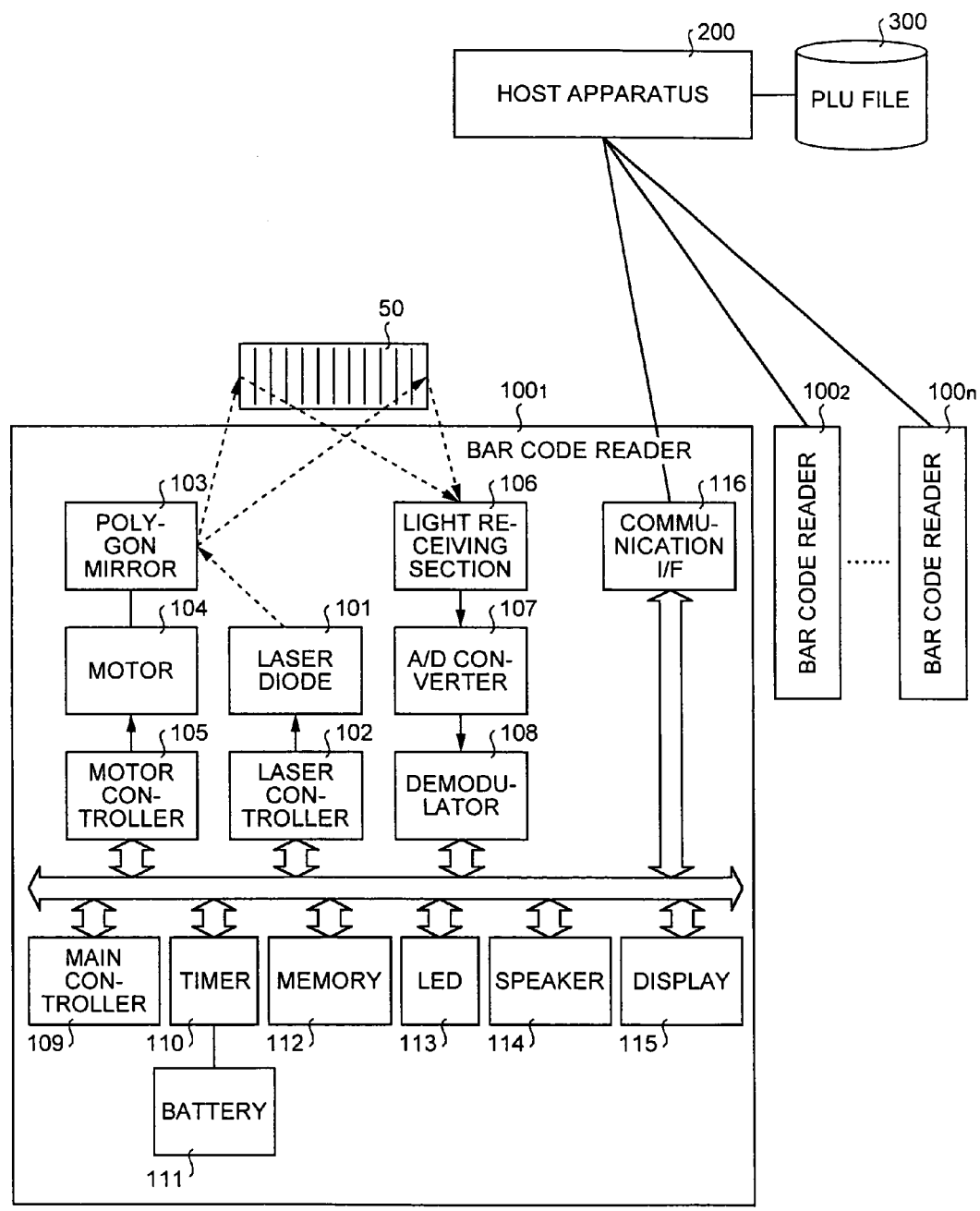
FIG. 1 is a block diagram of a bar code reader according to one embodiment of the present invention.

FIG. 1 is a block diagram of a POS system according to an embodiment of the present invention. Bar code readers $100_1$ to $100_n$ are placed at various locations in a shop. These bar code readers have an arrangement to optically read bar codes attached to articles, and transmit the read information to a host apparatus 200

The host apparatus 200 retrieves a PLU file 300 in which article information such as the name, the price and the like of the article is registered to correspond to the article code with pieces of the bar code information sequentially transmitted from each of the bar code readers 1001 to 100n used as a key whenever a bar code is scanned, and sends back the article information to the bar code reader that inquires the bar code information.

In the conventional POS systems the check of whether the term of the article has expired is performed by the host apparatus 200, however, in the present invention this check is performed by the bar code readers 1001 to 100n.

The types of bar codes used in the bar code readers 1001 to 100n include the following three types, for example:

(1) Year/month/date bar code,
(2) Year/month bar code, and
(3) Time setting bar code.

The (1) year/month/date bar code is a bar code obtained by coding six figures of year, month, and day ("021001" for Oct. 1, 2002) as article term information besides an article code. It is noted, however, actual term information has a month/year/day structure. Year/month/day bar codes of this type involve, for example, a space saving type RSS (Reduced Space Symbology)-Expand code.

The (2) year/month bar code is a bar code obtained by coding four-figure year and month ("0210" for October 2002) as coupon term information (term of validation) used in article discount or the like in addition to an article code. Year/month bar codes of this type involve, for example, Format 2 and Format 4 of a coupon code.

The (3) time setting bar code is a bar code for setting the date of a timer provided in each of the bar code readers 1001 to 100n. The types of the bar code are the following 10 types for incrementing or decrementing the year, month, day, hour and minute:

(a) Year incremented bar code,
(b) Month incremented bar code,
(c) Day incremented bar code,
(d) Hour incremented bar code,
(e) Minute incremented bar code,
(f) Year decremented bar code,
(g) Month decremented bar code,
(h) Day decremented bar code,
(i) Hour decremented bar code, and
(j) Minute decremented bar code.

In the bar code reader 1001, a laser diode 101 is controlled by a laser controller 102 to emit a scan laser beam. A polygon mirror 103 consists of a mirror finished surface member that reflects the laser beam from the laser diode 101. The polygon mirror 103 is rotated by a motor 104 to change the reflection direction of the beam, thereby giving a plurality of types of scan patterns. A motor controller 105 controls the driving of the motor 104.

The laser beam reflected by the polygon mirror 103 is irradiated onto the black and white bars of a bar code 50 in a direction, for example, from a left end to a right end. The bar code 50 is the year/month/day bar code, year/month bar code or time setting bar code.

A light receiving section 106 receives the reflection light irradiated on the bar code 50, and converts the light into an electric signal having an amplitude according to the magnitude of the reflection light. An A/D (Analog/Digital) converter 107 digitally samples the photoelectric transfer signal (analog signal) from the light receiving section 106, and converts the signal into a digital photoelectric transfer signal.

A demodulator 108 demodulates the character pattern (character string) of the bar code based on the photoelectric transfer signal from the A/D converter 107. The demodulator 108 also outputs a demodulation result as bar code information.

A main controller 109 controls the respective constituent elements of the reader 1001, and executes the term expiration check, the setting of the date of a timer 110, a warning processing at the time of term expiration, and the like. The operation of this main controller 109 will be explained later in detail. The timer 110 has a timer function and momentarily outputs present date information corresponding to present year, month, day, time, and minutes. A battery 111 supplies backup power to the timer 110.

A memory 112 stores firmware executed by the main controller 109, error time information and the like. The error time information is set so as to absorb the error of the timer 110 relative to absolute time, and used to absorb the error at the time of the term expiration check.

For example, as shown in FIG. 2, if the error time information is set at 0 hour, i.e., the error of the timer 110 is 0, then the main controller 109 determines that a term does not expire before, for example, 0:00 a.m. of Sep. 15, 2002, and that the term expires after 0:00 a.m.

If the error time information is set at two hours, i.e., the error of the timer 110 is less than two hours, then the main controller 109 determines that the term does not expire before, for example, 2:00 a.m. delayed by two hours from 0:00 a.m. of Sep. 15, 2002, and that the term expires after 2:00 a.m.

Likewise, if the error time information is set at four hours, i.e., the error of the timer 110 is less than four hours, the main controller 109 determines that the term does not expire before, for example, 4:00 a.m. delayed by four hours from 0:00 a.m. of Sep. 15, 2002, and that the term expires after 4:00 a.m.

An LED (Light Emitting Diode) 113 is a visual notification unit and an element that emits light of green, yellow or the like. The LED 113 is controlled by the main controller 109 to be turned on when the bar code is successfully read in a pattern shown in FIG. 3, a term expiration warning is issued, or the setting of the date to the timer 110 is completed.

A speaker 114 is a visual notification unit. The speaker 114 is controlled to produce sound by the main controller 109 in interlock with the LED 113 when the bar code is successfully read in the pattern shown in FIG. 3, the term expiration warning is issued, or the setting of the date to the timer 110 is completed.

A display 115 is a visual notification unit. The display 115 is controlled to make display by the main controller 109 in interlock with the LED 113 and the speaker 114 when the bar code is successfully read in the pattern shown in FIG. 3, the term expiration warning is issued, or the setting of the date to the timer 110 is completed.

This display 115 is of, for example, such a type as to display alphanumeric letters by seven segments. A communication I/F (interface) 116 controls communication between the reader 1001 and the host apparatus 200 based on a predetermined communication protocol. The bar code readers $100_2$ to $100_n$ are equal in configuration to the bar code reader $100_1$.

Figure 4:
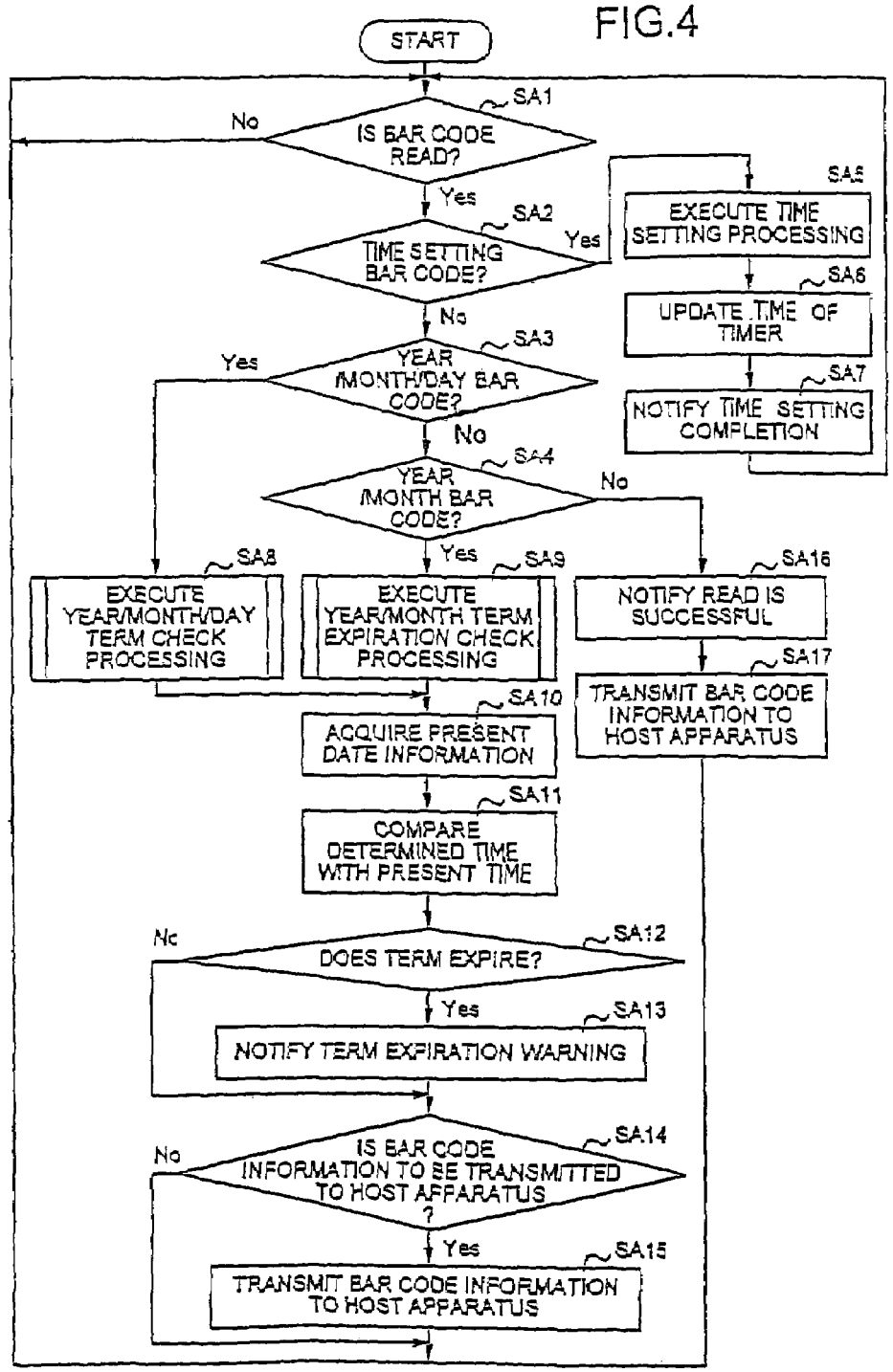
FIG. 4 is a flowchart of operation of the bar code reader according to the embodiment.

The operation of one embodiment will next be explained with reference to the flowcharts of FIGS. 4 to 6. An example in which the bar code reader $100_1$ shown in FIG. 1 reads a bar code and makes a term expiration check will be mainly explained At step SA1 shown in FIG. 4, the main controller 109 of the bar code reader $100_1$ determines whether the light receiving section 106, the A/D converter 107, and the demodulator 108 have read the bar code 50. In this example, the determination result is "No", and this determination is repeated If the time setting bar code is read as the bar code 50, the main controller 109 gives a determination result of "Yes" at the step SA1. At step SA2, the main controller 109 determines whether the bar code 50 is a date setting bar code, and gives a determination result of "Yes" in this example.

At step SA5, the main controller 109 executes a time setting processing for combining the bar codes (a) to (j), reading the combination, and setting a precise time (year, month, day, hour, and minute) to the timer 110. At step SA6, the main controller 109 updates the date of the timer 110 to, for example, 09:00 of Oct. 2, 2002 based on the read bar code information.

At step SA7, the main controller 109 notifies the LED 113, the speaker 114, and the display 115 of the completion of the time setting to the timer 110, and then conducts the determination at the step SA1.

If the year/month bar code is read as the bar code 50, the main controller 109 gives a determination result of "Yes" at the step SA1, and then gives a determination result of "No" at the step SA2. At step SA3, the main controller 109 determines whether the bar code 50 is the year/month/day bar code, and gives a determination result of "No" in this example.

At step SA4, the main controller 109 determines whether the bar code 50 is the year/month bar code, and gives a determination result of "Yes" in this example. At step SA9, the main controller 109 executes a year/month term expiration check processing.

Figure 5:
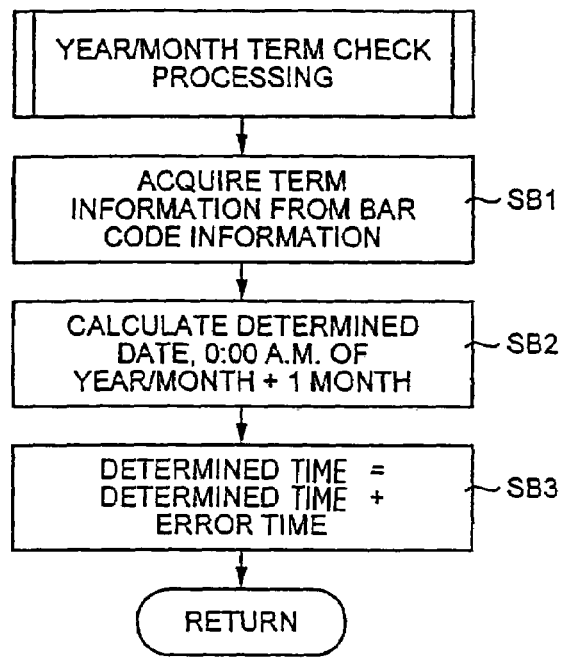
FIG. 5 is a flowchart of an year/month term check processing.
Figure 6:
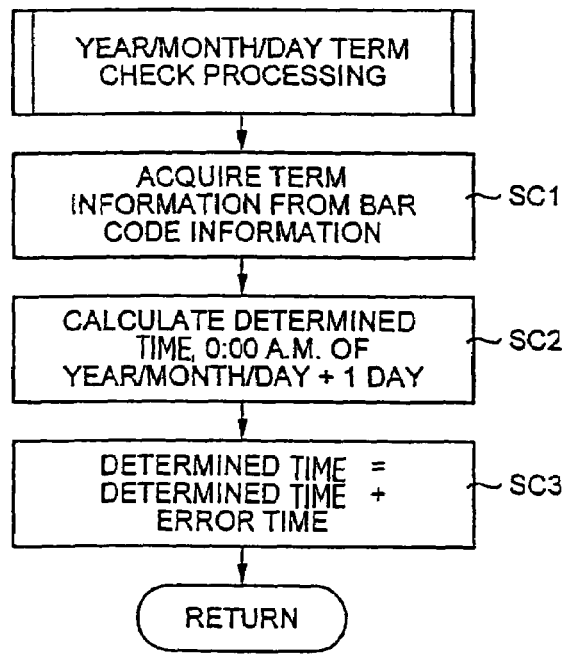
FIG. 6 is a flowchart of an year/month/day term check processing.
Figure 7:
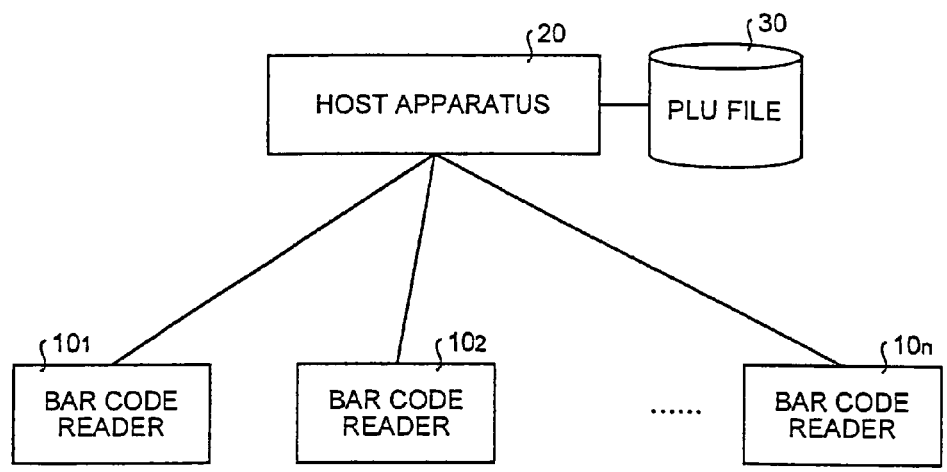
FIG. 7 is a block diagram of a conventional POS system.

To be specific, at step SB1 shown in FIG. 5, the main controller 109 acquires term information (year and month) from the bar code information read from the bar code 50 (year/month bar code in this example). At step SB2, the main controller 109 calculates a determined date based on which the term expiration check is conducted.

In this example, the determined date is 0:00 a.m. on a day incremented by one month from the year and month of the term information acquired at the step SB1. For example, if the year and month of the term information is September 2002, the determined date is 0:00 a.m. of Oct. 01, 2002.

At step SB3, the main controller 109 reads error time information (see FIG. 2) from the memory 112, adds error time acquired from the error time information to the determined date calculated at the step SB2, and sets the addition result as the determined date. If the error time is, for example, two hours, the determined date is 2:00 a.m. of Oct. 1, 2002.

Referring back to FIG. 4, at step SA10, the main controller 109 acquires present date information from the timer 110. At step SA11, the main controller 109 compares the determined date calculated at the step SB3 (see FIG. 5) with the present date acquired from the present date information.

At step SA12, the main controller 109 determines whether the term of a coupon or the like set to the bar code 50 (year/month bar code) expires, i.e., whether the present date passes the determined time. If this determination result is "No", the main controller 109 makes a determination at step SA14.

Figure 3:
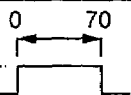
FIG. 3 explains various notification methods in the embodiment.

In this example, the determination result at the step SA12 is "Yes". At step SA13, the main controller 109 notifies the LED 113, the speaker 114, and the display 115 of a term expiration warning as shown in FIG. 3.

At the step SA14, the main controller 109 determines whether the bar code information read from the bar code 50 (year/month bar code) is to be transmitted to the host apparatus 200. For example, if the term expires, the main controller 109 gives a determination result of "Yes" at the step SA14.

At step SA15, the main controller 109 transmits the bar code information corresponding to the expired bar code 50 (year/month bar code) as well as information on the term expiration to the host apparatus 200 through the communication I/F 116. As a result, the host apparatus 200 recognizes that the term of the year/month bar code expires. If the determination result at the step SA14 is "No", the main controller 109 makes the determination at the step SA1.

If the year/month/day bar code is read as the bar code 50, the main controller 109 gives a determination result of "Yes" at the step SA1, and then gives a determination result of "No" at the step SA2. At the step SA3, the main controller 109 determines whether the bar code 50 is the year/month/day bar code, and gives a determination result of "Yes" in this example.

At step SA8, the main controller 109 executes a year/month/day term check processing. To be specific, at step SC1 shown in FIG. 6, the main controller 109 acquires term information (year, month, and day) from the bar code information read from the bar code 50 (the year/month/day bar code in this example). At step SC2, the main controller 109 calculates the determined date based on which a term expiration check is conducted.

In this example, the determined date is 0:00 a.m. on a day incremented by one day from the year, month, and day of the term information acquired at the step SC1. For example, if the year, month, and day of the date information is Sep. 15, 2002, the determined date is 0:00 a.m. of Sep. 16, 2002.

At step SC3, the main controller 109 reads error time information (see FIG. 2) from the memory 112, adds the error time acquired from the error time information to the determined date calculated at the step SC2, and sets the addition result as the determined date. For example, if the error time is two hours, the determined date is 2:00 a.m. of Sep. 16, 2002.

Referring back to FIG. 4, at the step SA10, the main controller 109 acquires present date information from the timer 110. At the step SA11, the main controller 109 compares the determined date calculated at the step SC3 (see FIG. 6) with the present date obtained from the present date information.

At the step SA12, the main controller 109 determines whether the term of the coupon or the like set to the bar code 50 (year/month/day bar code) expires, i.e., whether the present date passes the determined time. If this determination result is "No", the main controller 109 makes the determination at the step SA14.

In this example, the determination result at the step SA12 is "Yes". At the step SA13, the main controller 109 notifies the LED 113, the speaker 114, and the display 115 of a term expiration warning as shown in FIG. 3.

At the step SA14, the main controller 109 determines whether the bar code information read from the bar code 50 (year/month/day bar code) is to be transmitted to the host apparatus 200. For example, if the term expires, the main controller 109 gives a determination result of "Yes" at the step SA14.

At the step SA15, the main controller 109 transmits the bar code information corresponding to the expired bar code 50 (year/month/day bar code) as well as information on the term expiration to the host apparatus 200 through the communication I/F 116. As a result, the host apparatus 200 recognizes that the term of the year/month/day bar code expires. If the determination result at the step SA14 is "No", the main controller 109 makes the determination at the step SA1. Further, if a bar code other than the year/month/day bar code or the year/month bar code is read, the main controller 109 gives a determination result of "Yes" at the step SA1, and then gives a determination result of "No" at the step SA2. At the step SA3, the main controller 109 determines whether the bar code 50 is the year/month/day bar code, and gives a determination result of "No". At the step SA4, the main controller 109 determines whether the bar code 50 is the year/month bar code, and gives a determination result of "No". At the step SA16, the main controller 109 reports that reading is successful. At the step SA17, the main controller 109 transmits the bar code information to the host apparatus.

As explained so far, according to the bar code reader of the embodiment, it is checked whether a term expires based on the term information acquired from the bar code information read by the light receiving section 106, the A/D converter 107, and the demodulator 108. If the term expires, the expiration is notified to the LED 113, the speaker 114, and the display 115 (see FIG. 2). Therefore, it becomes possible to distribute the load to the bar code readers and the host apparatus and thus reduce the load on the host apparatus.

Furthermore, the term expiration is checked based on the comparison result of comparing the present date information obtained from the timer 110 with the determined date set in light of the error time information. Therefore, it is possible to compensate for the error of the timer 110, and to improve term expiration check accuracy.

Furthermore, if the date expires, the bar code information is transmitted to the host apparatus 200. Therefore, the host apparatus 200 can grasp the result of the term expiration.

Moreover, the date of the timer 110 is set using the time setting bar code as the bar code 50. Therefore, it is possible to simplify a time setting operation.

Thus, according to bar code reader of the present invention, it is possible to reduce the load on the host apparatus so that a high-end machine is not required. Moreover, it becomes possible to check accurately whether the term of the article has expired. Furthermore, even the host apparatus can keep an account of the articles whose term has expired. Moreover, the date can be set with easily.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A bar code reader bar code reader having an arrangement to communicate with a host apparatus in a POS system, the bar code reader comprising:
   a read unit that reads a bar code attached to an article, and outputs bar code information corresponding to the read bar code;
   a term information acquisition unit that acquires term information included in the bar code information;
   a term expiration check unit that calculates whether the term of the article has expired based on the term information;
   a notification unit that notifies that the term of the article has expired upon determination by the term expiration check unit that the term of the article has expired; and
   a timer unit that keeps record of a present time,
   wherein the term expiration check unit calculates whether the term of the article has expired based on a comparison of the present time with the term information, and
   wherein the term information is set by giving consideration to time error.

2. The bar code reader according to claim 1, further comprising a transmission unit that transmits the bar code information to the host apparatus upon determination by the term expiration check unit that the term of the article has expired.

3. The bar code reader according to claim 1, further comprising a time setting unit that sets a time in the timer unit using a time setting bar code.

4. The bar code reader, according to claim 1, the term expiration check unit comprising:
   a controller calculating the term expiration, and
   a memory connected to the controller and storing time error information used by the controller in the calculation of the term expiration.

5. A bar code read control method applied to a bar code reader having an arrangement to communicate with a host apparatus in a POS system, the method comprising:
   reading a bar code attached to an article, and outputting bar code information corresponding to the read bar code by using a bar code reader;
   acquiring term information included in the bar code information;
   calculating whether a term of the article has expired based on the term information, the calculating being performed by the bar code reader;
   notifying that the term of the article has expired upon determination that the term of the article has expired; and
   acquiring a present time from a timer unit,
   wherein the calculating comprises:
   setting a length of time as time error information, and
   comparing a present time with the term information and considering the time error.

6. The method according to claim 5, further comprising transmitting the bar code information to the host apparatus upon determination that the term of the article has expired.

7. The method according to claim 5, further comprising setting the present time in the timer unit using a time setting bar code.

8. A bar code reader for a POS system, the bar code reader comprising:
   a term expiration check unit that calculates whether a term of an article has expired based on a comparison of a present time with term information;
   a notification unit that notifies a remote apparatus that the term of the article has expired; and a timer unit that keeps a record of a present time, and the comparison considers a settable time error.

9. A bar code read control method applied to a bar code reader communicating with a remote apparatus in a POS system, the method comprising:

calculating whether a term of an article has expired based on a comparison of a present time with term information, the calculating being performed by the bar code reader;

notifying the remote apparatus that the term of the article has expired; and keeping a record of a current time and setting a time error, wherein the comparison is adjusted for the time error.

* * * * *

UNITED STATES PATENT AND TRADEMARK OFFICE
CERTIFICATE OF CORRECTION

| | | |
|---|---|---|
| PATENT NO. | : 7,051,936 B2 | Page 1 of 1 |
| APPLICATION NO. | : 10/694274 | |
| DATED | : May 30, 2006 | |
| INVENTOR(S) | : Mitsuo Watanabe et al. | |

It is certified that error appears in the above-identified patent and that said Letters Patent is hereby corrected as shown below:

Column 8, line 2, delete "bar code reader" second occurrence

Signed and Sealed this

Thirty-first Day of October, 2006

JON W. DUDAS
*Director of the United States Patent and Trademark Office*